April 28, 1970  O. H. WINN  3,509,426
CAPACITOR WITH IONIC CONDUCTING CERAMIC ELECTROLYTE
Filed July 31, 1967
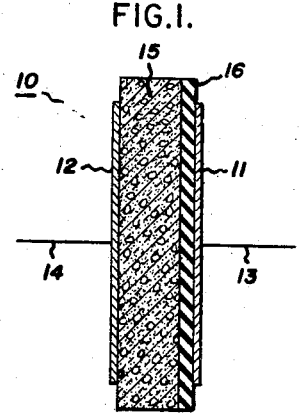
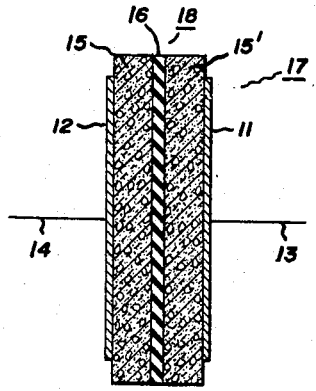
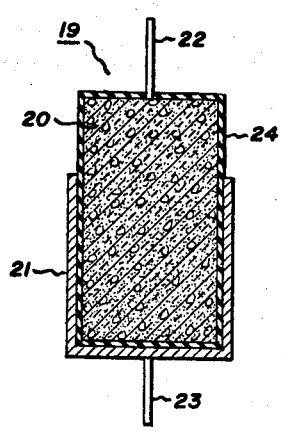
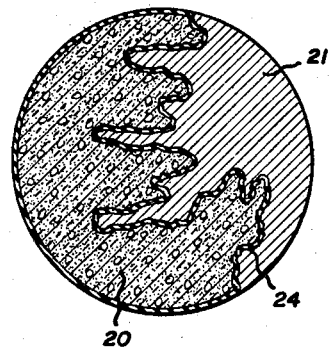
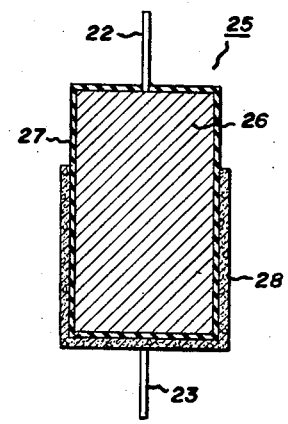
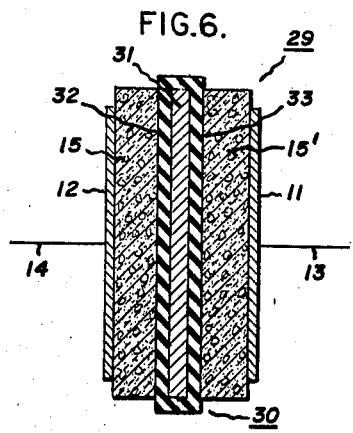
INVENTOR:
OLIVER H. WINN,
BY *James J. Lichiello*
HIS ATTORNEY.

United States Patent Office 3,509,426
Patented Apr. 28, 1970

3,509,426
CAPACITOR WITH IONIC CONDUCTING CERAMIC ELECTROLYTE
Oliver H. Winn, Glens Falls, N.Y., assignor to General Electric Company, a corporation of New York
Filed July 31, 1967, Ser. No. 657,253
Int. Cl. H01g 9/00
U.S. Cl. 317—230                    14 Claims

ABSTRACT OF THE DISCLOSURE

An electrical capacitor is disclosed which utilizes a ceramic dielectric in the form of an ionic conducting ceramic, for example, a modified beta alumina ceramic.

---

This invention relates to electrical capacitor devices, and more particularly to electrical capacitors incorporating a pair of electrodes having a dielectric layer and an ionic conducting ceramic material therebetween.

Electrolytic capacitors ordinarily utilize, as an electronic barrier, a wet electrolyte which may be in a liquid form, or a semi-solid form such as a gel as paste, as semi-solid embodiments. The use of wet type electrolytes entails a number of important problems not only of a mechanical or physical nature such as those related to handling, storage, capacitor assembly, seals and shelf life, but also of an electrical and chemical nature such as those related to choice of materials effective with and compatible with wet electrolytes. In many instances these noted problems become limitations to extended application and use of electrolytic capacitors. However, the wet electrolyte is needed to provide effective ion conductance which is desirable for electrolytic capacitor operation. Dry electrolytes are usually not ion conducting materials or do not have sufficient ion conductance for optimum electrolytic capacitor operation.

Accordingly, it is an object of this invention to provide an improved capacitor.

It is another object of this invention to provide an improved dry type capacitor.

It is yet another object of this invention to provide an improved dry type capacitor utilizing an ionic conducting ceramic electrolyte.

It is still another object of this invention to provide an improved capacitor utilizing a sodium ion conducting, beta alumina ceramic as the electrolyte therefor.

It is yet another object of this invention to provide a porous slug capacitor utilizing an ionic conducting modified beta alumina ceramic as the slug material.

It is another object of this invention to provide an oxidized valve metal porous slug capacitor impregnated with an ionic conducting ceramic material.

It is yet another object of this invention to provide an ionic conducting ceramic material, for capacitor use, having a region thereof modified to be non-conducting.

It has been discovered that an improved capacitor may be provided by the use of an ionic conducting ceramic as the electrolyte material in an electrical capacitor. Ion conducting ceramics may be suitably modified by process treatments including additions of or treatment with alkaline metals such as sodium, potassium, lithium and others of this class of metals, for increased ionic conducting characteristics, and suppression of other forms of conductance. More specifically, it has been discovered that beta alumina ceramic, in which the transport of sodium ions is the predominant conducting medium, is an effective dry electrolyte for capacitors.

Briefly described, this invention in one of its preferred forms utilizes a beta alumina ceramic as the electrolyte between a pair of electrodes and a dielectric barrier layer to provide a capacitor configuration. The beta alumina ceramic may be modified by the addition of sodium thereto and subsequent sintering to provide improved sodium ion conductance. The dielectric barrier or blocking layer may be associated with the counter-electrode of the pair of electrodes, or may be integral with the ceramic material as a portion thereof. The barrier layer may also be a separate layer of a suitable material attached to or a part of the ceramic or electrode structures.

This invention will be better understood when taken in connection with the following description and the drawings in which:

FIG. 1 is an illustration of an improved capacitor in accordance with the teachings of this invention;

FIG. 2 is an illustration of an non-polar modification of this invention;

FIG. 3 is an illustration of a slug type capacitor utilizing the teachings of this invention;

FIG. 4 is an end cross-sectional view of the invention of FIG. 3;

FIG. 5 is a modified structure of the FIG. 4 embodiment;

FIG. 6 is a modified form of the non-polar construction of FIG. 2.

Referring now to FIG. 1, a capacitor structure 10 is disclosed which includes an anode electrode 11, a spaced counterelectrode 12, and their corresponding leads 13 and 14 respectively. Between the electrodes 11 and 12 there is provided an electrolyte 15, in the form of an ionic conducting ceramic material, and a barrier layer 16 which physically space electrodes 11 and 12, and in one form of this invention, are in coextensive contact with the electrodes over a significant and predetermined area thereof.

In the modification of FIG. 1, electrode 11 is denoted as the anode electrode and accordingly the dielectric barrier layer 16 is provided between electrode 11 and ceramic electrolyte 15. The operation of capacitor 10, as described, is similar to that generally known for electrolytic capacitors. For example, when connected to a suitable source of electrical power, electrons pass from counterelectrode 12 into the adjacent surface of the ceramic electrolyte 15. The ions within ceramic electrolyte 15 move freely under the influence of the electron surface charge to form a similar effective charge on the opposite surface thereof. This transferred charge is in the form of ion vacancies rather than electrons, thereby creating a surface charge without the deleterious effect of free surface electrons which would more easily penetrate the dielectric barrier layer. The accumulation of ion vacancies on the ceramic electrolyte surface adjacent to the dielectric barrier layer represents the electrical charge stored in the capacitor.

The foregoing operation includes the progress of transport of ions in the dry ceramic electrolyte. One preferred dry ceramic electrolyte is an alumina ceramic which has been effectively modified so that it is an electrolytic material which under usual capacitor operation conditions is an ionic conducting medium. More specifically, one preferred alumina ceramic is a beta alumina ceramic which includes sodium therein, and which may be treated, for example, by sintering to provide improved sodium ion mobility therein.

Beta alumina is a sodium aluminate following the general formula $Na_2O \cdot 11Al_2O_3$, sometimes reported also as $Na_2O \cdot 6Al_2O_3$, the structure of which is more fully described in Z. Krist, 97, 1937, pg. 59, C. A. Beavers, M. A. S. Ross. Beta alumina is prepared by melting together desired quantities of aluminum oxide and sodium compounds to provide a layer type structure having a density of about 20% less than that of alpha alumina, thus providing extensive open spaces therein for ion mobility. While the ionic conducting characteristics of this material may be relatively low at the usual operating temperatures for electrolytic capacitors, i.e., below about 150° C., conductivity remains within the scope of electrolyte conductivity for various electrolytic capacitors and may be further improved. Other ionic conducting materials of similar structure including alkali metal modified alumina and other ceramics may be employed in this invention. The ion conducting characteristics of these materials may be enhanced by proper treatment including heating, sintering and doping with other materials or other modifying processes.

In FIG. 1 the dielectric barrier layer 16 may be a separate layer deposited either on the ceramic material 14 or on the electrode 11. For example, layer 16 may be an oxide film formed electrolytically or chemically on a valve metal electrode 11, or a suitable deposited layer of such materials as silicon dioxide, barium titanate and other known dielectrics suitable for capacitor use.

Alternately the dielectric barrier layer 16 may be formed as a layer or region of the ceramic material 15. For example, ceramic material 15 may have a surface layer section suitably treated to remove sodium, Na$_2$SO, and thus provde a dielectric barrier or blocking layer. Such treatment may be in the form of heating or sintering, chemical leaching, and other controllable processes including establishing voltage gradients to move ions from the desired layer. If desirable, both operations may be utilized, i.e., providing a barrier layer section in ceramic material 15 and depositing a barrier layer material on the noted ceramic section or the adjacent electrode. Where one such layer 16 is employed the capacitor is referred to as a polar type. Where a layer 16 is provided between each electrode and ceramic 15 the capacitor is referred to as non-polar.

FIG. 2 is a non-polar modification 17 of the invention of FIG. 1. In FIG. 2 electrodes 11 and 12 are separated by a ceramic composite 18 which includes a pair of beta alumina ceramic layers 15 and 15' separated by a dielectric barrier or blocking layer 16. In the non-polar configuration leads 13 and 14 may be connected to either the positive or negative side of an electrical power supply. Electrons are caused to be moved out of one of the electrodes into the surface of the ionically conducting beta alumina ceramic, causing sodium ions to migrate to form an equivalent surface charge on the opposite or dielectric side of the ceramic.

In order to provide a good electrical contact between an electrode and adjacent beta ceramic, particularly between the barrier layer and adjacent electrode, a suitable conducting ceramic or oxide such as MnO$_2$ may be deposited, as is the known practice in electrolytic capacitors, on the barrier layer and the electrode attached to the conducting MnO$_2$ layer. One example of the use of MnO$_2$ as well as deposited material electrodes is disclosed in U.S. Patent 3,302,073—Broodo, assigned to the same assignee as the present invention.

FIG. 3 discloses the configuration of a porous slug anode type electrolytic capacitor 19. In FIG. 3 a slug anode 20 of beta alumina ceramic is partly encased by a counterelectrode 21. Electrical leads 22 and 23 connect to anode body 19 and counterelectrode respectively. For illustrative capacitor structure, reference is made to the cross-sectional view of FIG. 4. In FIG. 4 beta alumina ceramic body 20 is treated chemically to provide a non-conducting barrier layer 24 along the surfaces of the pores as well as other exposed surfaces. Alternately, or in combination therewith, layer 24 may be an electrically non-conducting material such as barium titanate deposited on and within body 20 and fired in situ. Thereafter counterelectrode 21 is attached to layer 24. The counterelectrode 21 is expeditiously attached by simply dipping body 20 in a molten metal bath, with vacuum impregnation if desirable to provide a coating electrode. Counterelectrode 21 may also take the form of a suitably deposited material such as graphite, MnO$_2$ or beta alumina ceramic in the pores of body 20.

A further modification of the FIG. 4 invention is illustrated in FIG. 5. In FIG. 5 the body 26 is a porous sintered valve metal body having an oxide coating thereon as described for example in U.S. Patent 3,255,390—Ruscetta, assigned to the same assignee as the present invention. Body 26 is impregnated with an ionic conducting ceramic material to provide a coating 27 on the internal and external surfaces of body 26. Ceramic material layer 27 in this instance serves as the electrolyte and as a base for a counterelectrode layer 28.

FIG. 6 illustrates a further modification of this invention following the principles as described for FIGS. 2 and 5. In FIG. 6 capacitor structure 29 comprises a pair of electrodes 11 and 12 with a composite 30 therebetween. Composite 30 includes a spaced pair of ceramic electrolyte sections 15 and 15' having a valve metal section 31 therebetween. Valve metal structure 31 is suitably oxidized to provide opposed dielectric barrier layer surfaces 32 and 33 adjacent ceramic sections 15 and 15' respectively. Valve metal structure 31 as well as any other electrode of a valve metal may be produced from those valve metals common to the electrolytic capacitor art, examples being tantalum, aluminum, zirconium and niobium.

The objects of this invention are attained by the use of an ionic conducting ceramic material, particularly beta alumina ceramic as the ionic conducting electrolyte in a capacitor. The material is adaptable to various operational embodiments in addition to those shown and described and may be employed in conjunction with or as a part of other components of electrical capacitors including impregnation by wet type electrolytes.

While the present invention has been described with reference to particular embodiments thereof, it will be understood by those skilled in the art that numerous modifications may be made without departing from the scope and spirit of the invention.

What is claimed as new and desired to be secured by Letters Patent of the United States is:

1. An electrical capacitor comprising a pair of spaced electrodes, a dielectric barrier layer between said electrodes, and a ceramic electrolyte material disposed between and in contact with one of said electrodes and said dielectric barrier layer, said ceramic electrolyte material having means for predominantly intrinsic ion conductance and having a minimum of electron conductance therein.

2. An electrical capacitor according to claim 1, said dielectric barrier layer being disposed on the surface of at least one of said electrodes.

3. The invention as recited in claim 1 wherein said ceramic includes a material selected from the class of alkali metal modified alumina ceramics, magnetoplumbite ceramics, and valve metal ceramics.

4. The invention as recited in claim 1 wherein said material is a beta alumina ionic conducting ceramic.

5. The invention as recited in claim 4 wherein said beta alumina ionic conducting ceramic is cation conducting and corresponds generally to Na$_2$O·11Al$_2$O$_3$.

6. The invention as recited in claim 1 wherein said dielectric barrier layer includes a layer of said ceramic electrolyte rendered substantially non-conducting.

7. The invention as recited in claim 1 wherein said dielectric barrier layer includes a layer of a non-conducting material between one or both electrodes and said ceramic electrolyte.

8. The invention as recited in claim 7 wherein said layer is an oxide coating on at least one of said electrodes.

9. A capacitor comprising a pair of spaced electrodes and a composite electrolyte interposed therebetween, said composite electrolyte comprising outer end sections of beta alumina ceramic electrolyte in contact with said electrodes and an intermediate spacing layer in contact with said end sections, said layer being substantially non-conducting.

10. The invention as recited in claim 9 wherein said layer is a valve metal oxide layer on a valve metal section.

11. A slug type capacitor comprising in combination:
(a) a sintered porous body composed of an ionic-conducting ceramic electrolyte material;
(b) a dielectric material layer on the surfaces of said body;
(c) an electrode in contact with a large area of said dielectric material layer and at least partly encasing said body;
(d) and electrical connection means to said ceramic electrolyte material and said electrode.

12. The invention as recited in claim 11 wherein said ceramic electrolyte material is a beta alumina ionic conducting ceramic.

13. A slug anode type capacitor comprising:
(a) a porous sintered valve metal slug anode;
(b) a valve metal oxide formed on the exposed surfaces of said anode;
(c) an ionically conducting ceramic electrolyte material layer impregnating said anode;
(d) and means to provide electrical connection to said anode and said ceramic electrolyte material layer.

14. The invention as recited in claim 13 wherein said ceramic layer is an ionic conducting beta alumina ceramic.

References Cited

UNITED STATES PATENTS

| | | | |
|---|---|---|---|
| 3,139,568 | 6/1964 | Ishikawa | 317—230 |
| 3,148,091 | 9/1964 | Bahe | 317—238 X |
| 3,417,301 | 12/1968 | Galli | 317—238 |
| 3,138,487 | 6/1964 | Tragert | 136—84 |
| 3,419,759 | 12/1968 | Hayakawa | 317—230 |
| 3,419,760 | 12/1968 | Raleigh | 317—230 |

OTHER REFERENCES

Journal of The American Ceramic Society, vol. 33, 1950; pp. 91–95; an article entitled: Glasses as Electrolytes in Galvanic Cells—Silver Glasses.

JAMES D. KALLAM, Primary Examiner

U.S. Cl. X.R.

136—153; 252—62.2; 317—238